(12) United States Patent
Chen

(10) Patent No.: US 7,857,276 B2
(45) Date of Patent: Dec. 28, 2010

(54) COOLER PAD FOR NOTEBOOK COMPUTER

(75) Inventor: Te-Sheng Chen, Taipei (TW)

(73) Assignee: Chen-Source Inc., Chung Ho, Taipei Hsien (TW)

( * ) Notice: Subject to any disclaimer, the term of this patent is extended or adjusted under 35 U.S.C. 154(b) by 193 days.

(21) Appl. No.: 12/320,558

(22) Filed: Jan. 29, 2009

(65) Prior Publication Data

US 2010/0186928 A1  Jul. 29, 2010

(51) Int. Cl.
*A47G 29/00* (2006.01)
(52) U.S. Cl. ............... 248/346.01; 165/76; 361/679.48; 361/695
(58) Field of Classification Search ............ 248/346.01, 248/346.03; 165/76; 361/679.48, 695
See application file for complete search history.

(56) References Cited

U.S. PATENT DOCUMENTS

| | | | | |
|---|---|---|---|---|
| 6,652,223 | B1 * | 11/2003 | Horng et al. ............... | 415/53.1 |
| 6,781,833 | B2 * | 8/2004 | Lu .............................. | 361/695 |
| 7,113,403 | B2 * | 9/2006 | Kuo et al. ................... | 361/697 |
| 2003/0231466 | A1 * | 12/2003 | Huang ......................... | 361/687 |
| 2008/0084661 | A1 * | 4/2008 | Lee ............................. | 361/687 |
| 2008/0218969 | A1 * | 9/2008 | Muraki ...................... | 361/695 |
| 2010/0220445 | A1 * | 9/2010 | Fujiwara .................... | 361/695 |
| 2010/0226088 | A1 * | 9/2010 | Huang ................... | 361/679.48 |

* cited by examiner

*Primary Examiner*—Ramon O Ramirez
(74) *Attorney, Agent, or Firm*—Bacon & Thomas, PLLC

(57) ABSTRACT

A cooler pad for supporting a notebook computer on a user's lap is disclosed to include a soft pad having an accommodation space, a cooling fan mounted in the accommodation space, two slotted cover plates attached to the top and bottom sides of the accommodation space and fastened together to hold down the cooling fan in the accommodation space for enabling the power cord of the cooling fan to be extended to the outside of the soft pad for connection to the notebook computer to obtain the necessary working voltage for the cooling fan during operation of the notebook computer.

12 Claims, 6 Drawing Sheets

US 7,857,276 B2

COOLER PAD FOR NOTEBOOK COMPUTER

BACKGROUND OF THE INVENTION

1. Field of the Invention

The present invention relates to a pad for supporting a notebook computer on a user's lap and more particularly, to a cooler pad for notebook computer, which comprises a soft pad having an accommodation space cut through the top and bottom sides, and two cover plates covered to the top and bottom sides of the accommodation space to hold down a cooling fan in the accommodation space for causing currents of air to carry heat away from the notebook computer been supported on the soft pad.

2. Description of the Related Art

Following fast development of technology, many different types of computers including desktop computers and notebook computers have been created and have appeared on the market. For the advantage of high mobility, notebook computers are intensively used by people nowadays. The casing of a notebook computer is normally made of magnesium-aluminum alloy for quick dissipation of heat. The IC board and other major component parts of a notebook computer are gathered in the bottom side. When a notebook computer is started up, a big amount of thermal energy is soon gathered is the bottom side. Therefore, a notebook computer generally has heat sink, cooling fan, heat pipe or like means mounted therein for quick dissipation of waste heat. When a heat sink and a heat pipe are used in a notebook computer, they are kept in direct contact with the magnesium-aluminum alloy casing of the notebook computer. By means of utilizing the broad surface area of the magnesium-aluminum alloy casing, the total heat dissipation surface area is relatively increased, enhancing heat dissipation efficiency.

Further, there are commercial notebook cooling pads for supporting and cooling a notebook computer. These notebook cooling pads commonly have a rigid frame structure that holds a cooling fan or cooler module on the inside for cooling the supported notebook computer. Because of rigid frame structure, these notebook cooling pads are commonly used to support a notebook computer on a desk or table. There are commercial soft notebook pads for use to support a notebook computer on a user's lap. These soft notebook pads are comfortable in use. However, the soft structure of the pad is not suitable for the positioning of a cooling fan. Therefore, these soft notebook pads are simply used to support a notebook computer on a user's lap, they cannot dissipate heat from the supported notebook computer.

SUMMARY OF THE INVENTION

The present invention has been accomplished under the circumstances in view. It is one object of the present invention to provide a cooler pad for notebook computer, which can comfortably support a notebook computer on a user's lap and rapidly dissipates waste heat from the notebook computer during the operation of the notebook computer.

To achieve this and other objects of the present invention, a cooler pad comprises a soft pad, which has an accommodation space extending through the top and bottom sides thereof, a cooling fan mounted in the accommodation space of the soft pad, two hard cover plates respectively attached to the top and bottom sides of the accommodation space and fastened together to hold down the cooling fan in the accommodation space for enabling the power cord of the cooling fan to be extended to the outside of the soft pad for connection to the notebook computer to obtain the necessary working voltage for the cooling fan during operation of the notebook computer. The cover plates have air vents for ventilation so that currents of air induced by the cooling fan can be circulated through the accommodation space to carry heat away from the notebook computer.

Further, each hard cover plate has a plurality of hooks and locating posts respectively inserted into respective locating holes in the soft pad. When the hooks and locating posts are inserted into the respective locating holes, the hooks and locating posts of one cover plate are respectively engaged with the hooks and locating posts of the other cover plate, holding down the cooling fan in position.

Each hard cover plate further has a plurality of retaining rods respectively inserted into the accommodation space and fastened to the cooling fan to hold down the cooling fan in the accommodation space.

DETAILED DESCRIPTION OF THE PREFERRED EMBODIMENT

Figure 1:
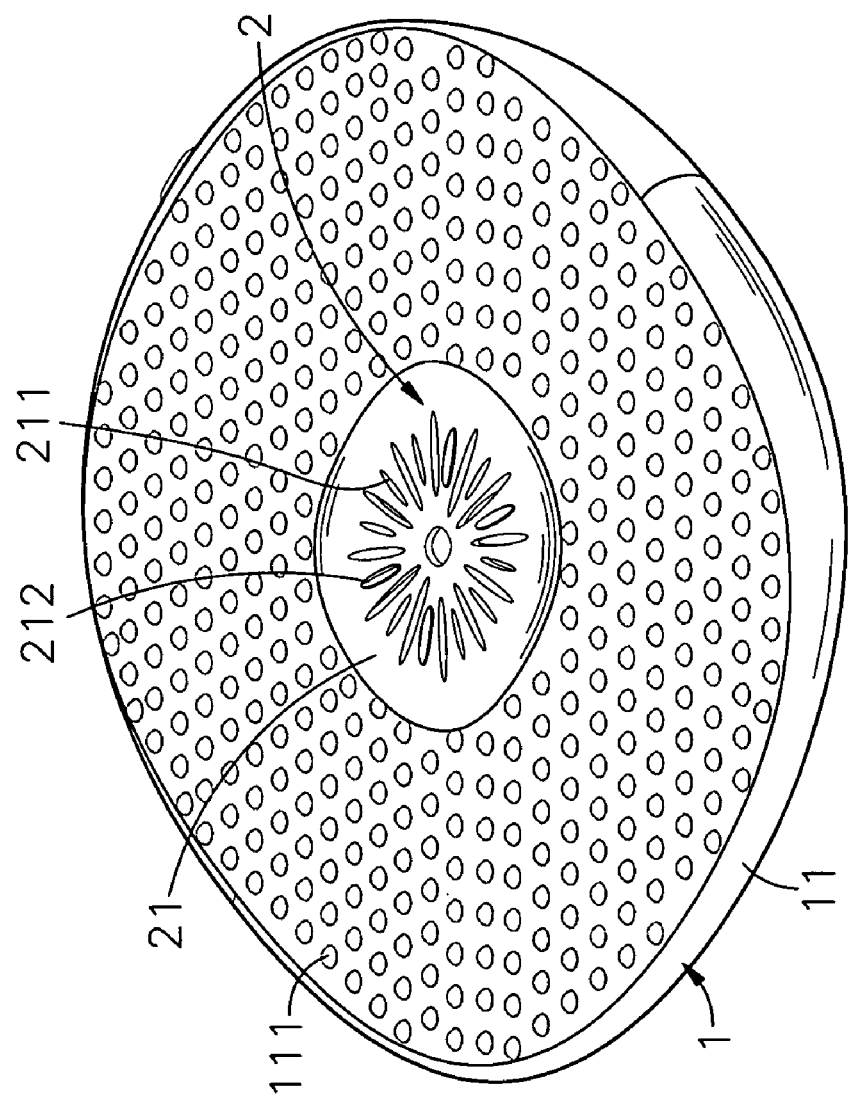
FIG. 1 is an elevational view of a cooler pad in accordance with the present invention.
Figure 2:
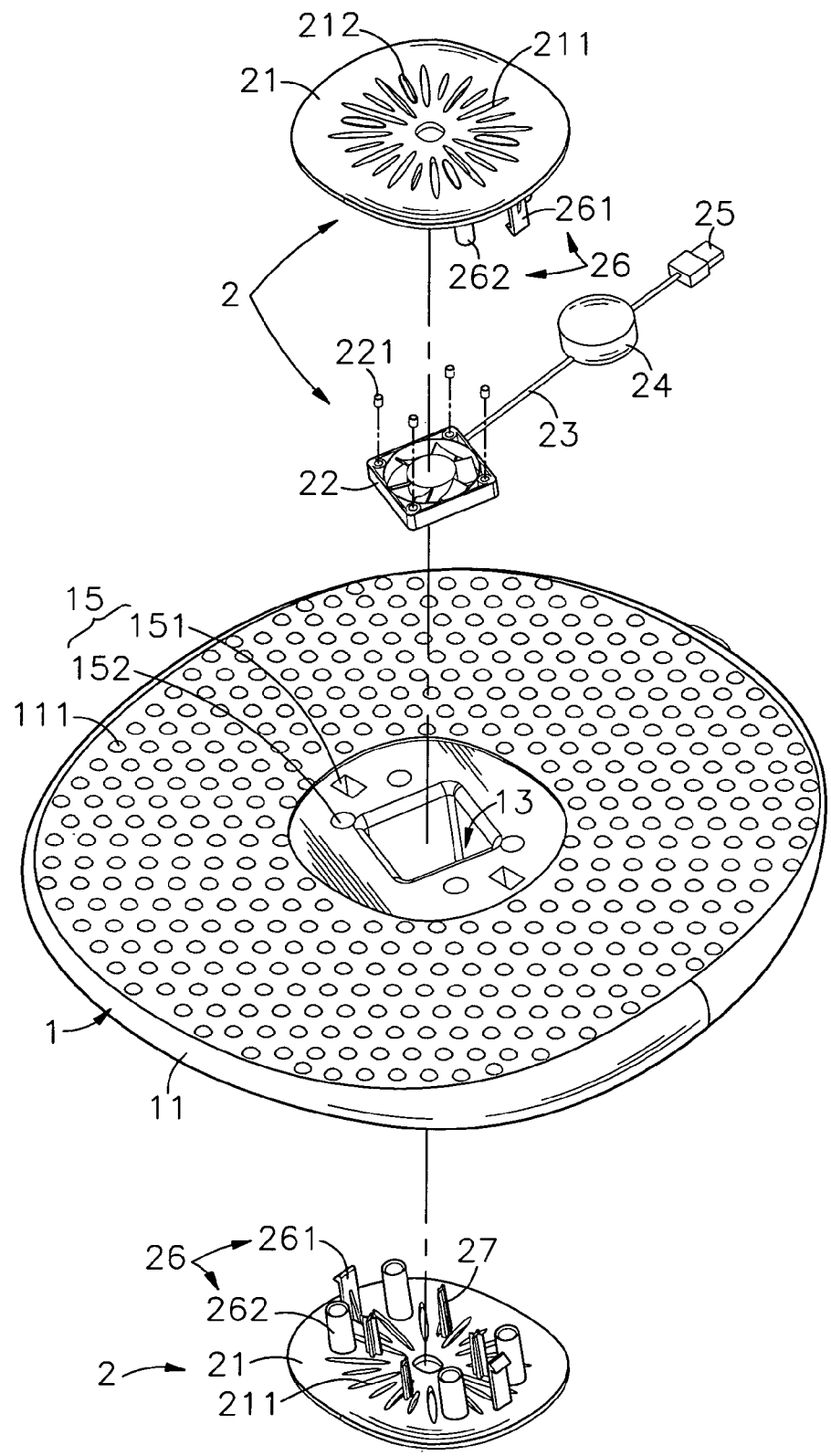
FIG. 2 is an exploded view of the cooler pad in accordance with the present invention.
Figure 3:
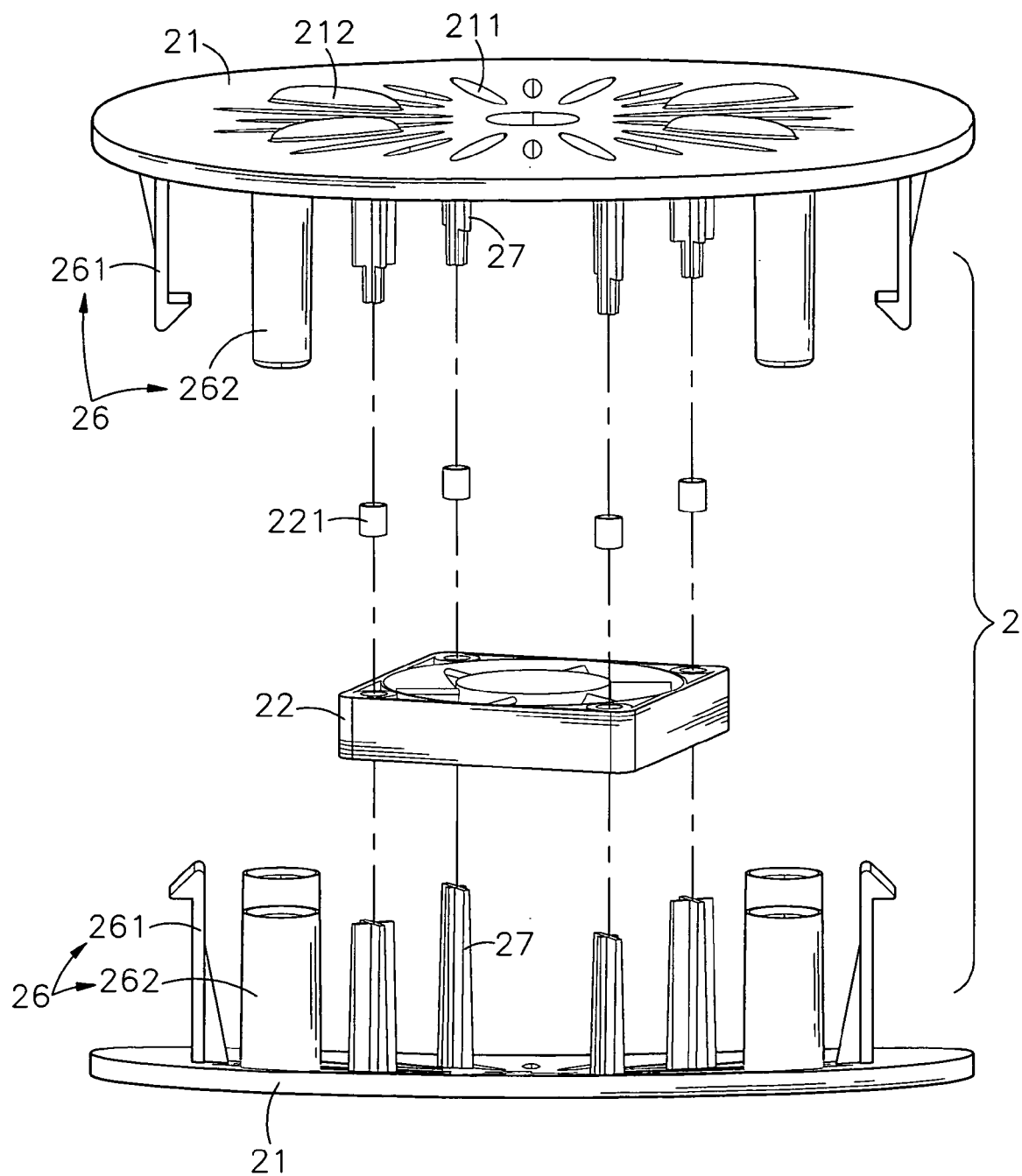
FIG. 3 is an exploded view in an enlarged scale of a part of the present invention, showing the structure of the cover plates and the relative positioning between the cooling fan and the cover plates.
Figure 4:
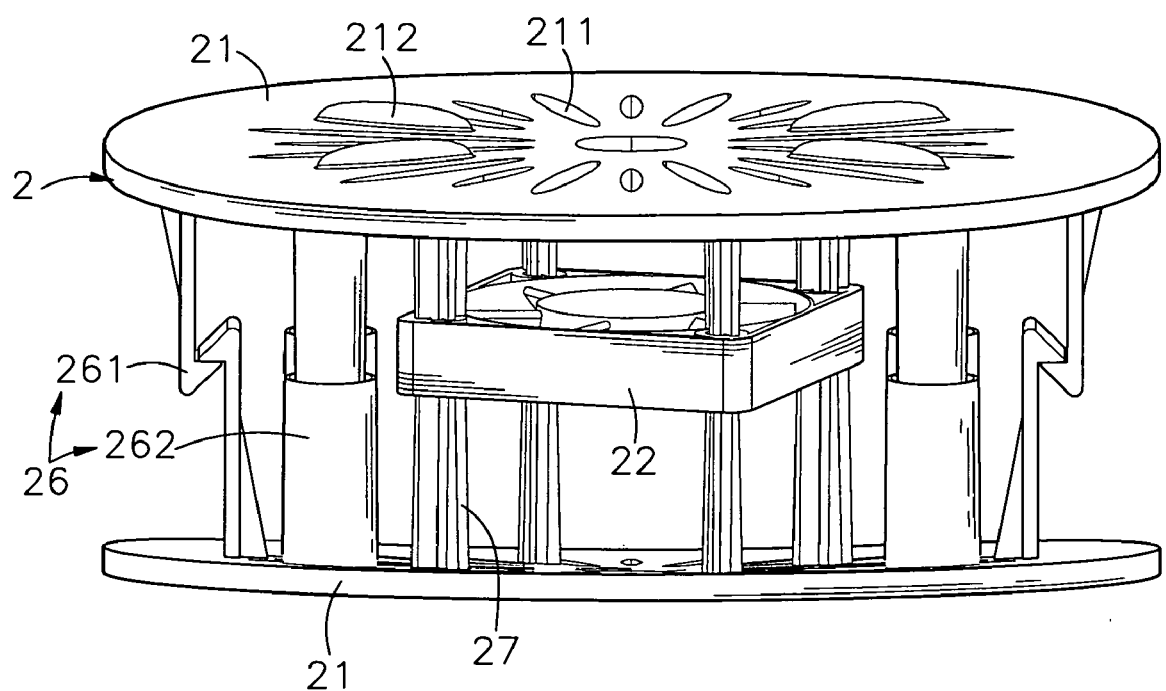
FIG. 4 is an assembly view of FIG. 3.

Referring to FIGS. 1~4, a cooler pad for a notebook computer in accordance with the present invention is shown comprising a soft pad 1, and a fan module 2.

The soft pad 1 comprises a cover layer 11, and a soft stuffing material 12 stuffed in the cover layer 11, a plurality of anti-slip devices, i.e., raised portions 111 protruded from the cover layer 11 and adapted for positioning on the user's lap and supporting a notebook computer above the user's lap, an accommodation space 13 vertically cut through the cover layer 11 and the soft stuffing material 12, a passage 14 transversely extended from the accommodation space 13 through the soft stuffing material 12 and the cover layer 11 to the periphery, and a plurality of locating holes 15 vertically cut through the cover layer 11 and the soft stuffing material 12 and spaced around the accommodation space 13. The locating holes 15 include a plurality of first locating holes 151 and a plurality of second locating holes 152.

The fan module 2 is mounted in the receiving space 13 of the soft pad 1, comprising two hard cover plates 21, a cooling fan 22, a power cord 23, a cable reel 24, and a power connector 25. The two cover plates 21 are respectively attached to the top and bottom sides of the soft pad 1, each having a plurality of air vents 211 for ventilation. One cover plate 21 that is attached to the top side of the soft pad 1 has a plurality of anti-slip devices, i.e., raised portions 111 protruded from the top wall thereof and kept in flush with the raised portions 111 on the top side of the soft pad 1 for supporting a notebook computer and holding it in place. The cooling fan 22 is positioned in the accommodation space 13 between the two cover plates 21 for causing currents of air through the air vents 211 and the accommodation space 13. Further, shock absorbing devices 221 are mounted in corners of the cooling fan 22 to protect the cooling fan 22 against shocks. The cable reel 24 is mounted in the passage 14. The power cord 23 extends from the cooling fan 22 and inserted through the cable reel 24. The power connector 25 is provided at the other end of the power cord 23 and disposed outside the passage 14. The cable reel 24 can let off the power cord 23, and automatically wind back the power cord 23 after the power cord 23 being pulled. Each cover plate 21 further comprises a positioning structure 26 and a plurality of retaining rods 27. The retaining rods 27 are inserted into the accommodation space 13 and fastened to the shock absorbing devices 221 and the cooling fan 22 to hold the cooling fan 22 in position. The positioning structure 26 of each cover plate 21 comprises a plurality of hooks 261 and locating posts 262. The hooks 261 and locating posts 262 of each cover plate 21 are respectively inserted into the first locating holes 151. When the two cover plates 21 are respectively attached to the top and bottom sides of the soft pad 1, the hooks 261 and locating posts 262 of one cover plate 21 are respectively inserted into the first locating holes 151 and second locating holes 152 of the soft pad 1 and the retaining rods 27 are inserted into the accommodation space 13 of the soft pad 1. At this time, the hooks 261 and locating posts 262 of one cover plate 21 are respectively forced into engagement with the hooks 261 and locating posts 262 of the other cover plate 21 and the retaining rods 27 of the two cover plates 21 are respectively fitted into the shock absorbing devices 221 and the cooling fan 22 to hold the cooling fan 22 in position, protecting the cooling fan 22 against vibration. This mounting arrangement allows quick separation of the cover plates 21 and the cooling fan 22 from the soft pad 1 for cleaning and repair work.

Further, the cover layer 11 of the soft pad 1 can be prepared from PVC sheet material, PVC fabric, nylon, genuine leather, artificial leather, cotton fabric, felt fabric, or linen fabric. The soft stuffing material 12 can be prepared from polyurethane, ethylene vinyl acetate, memory foam, or low-stress gel. Further, the connection structure between the two cover plates 21 can be done by means of any of a variety of other conventional techniques. Further, the power connector 25 can be a USB connector connectable to a notebook computer to obtain the necessary working voltage from the notebook computer for the cooling fan 22. Alternatively the power connector 25 can be a power plug connectable to an external electric outlet to obtain the necessary working voltage for the cooling fan 22. Alternatively, a power source, storage battery, dry cell or Li-battery may be installed in the soft pad 1 to provide the cooling fan 22 with the necessary working voltage.

Figure 5:
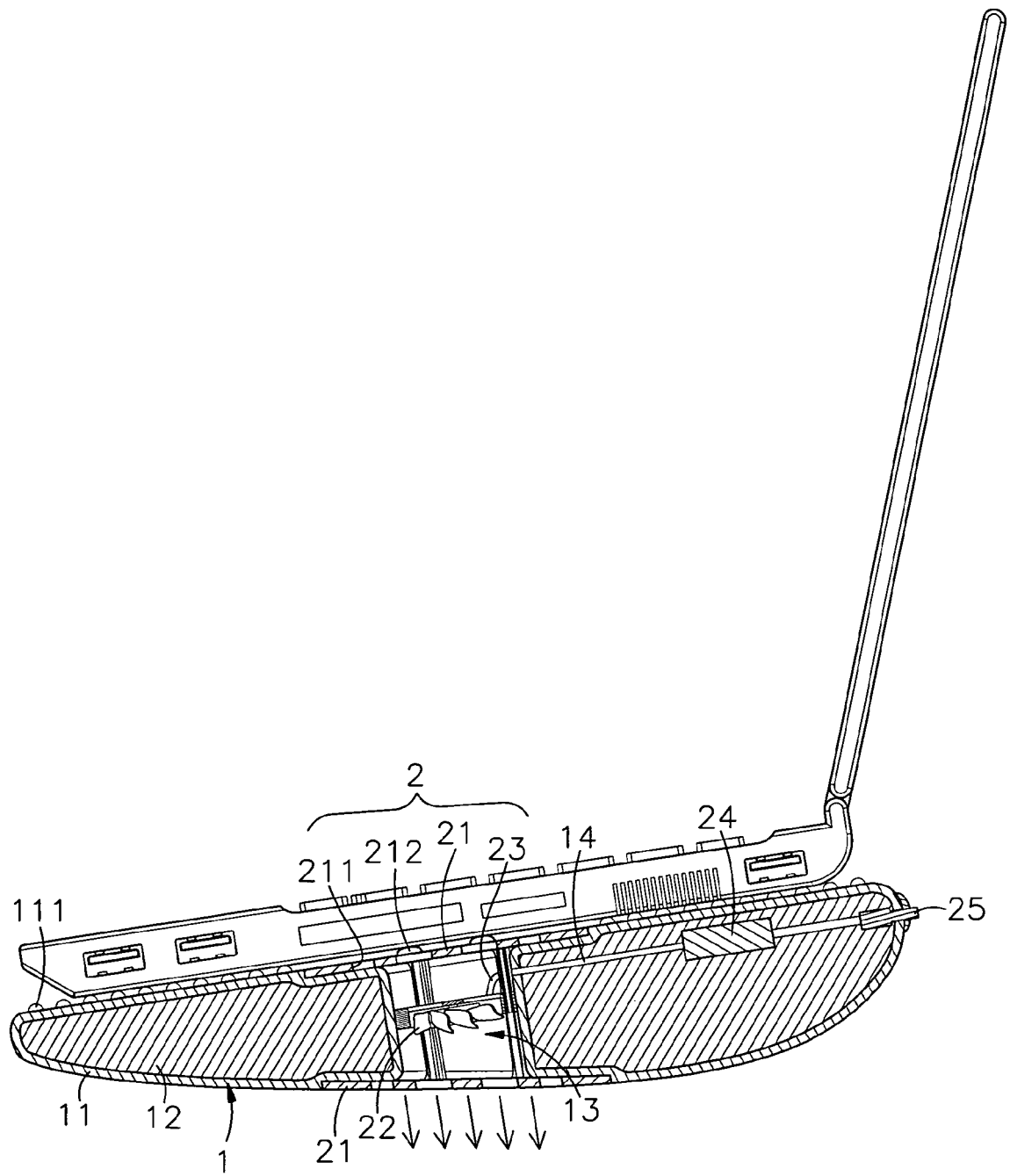
FIG. 5 is a schematic sectional view, showing a notebook computer placed on the cooler pad in accordance with the present invention.
Figure 6:
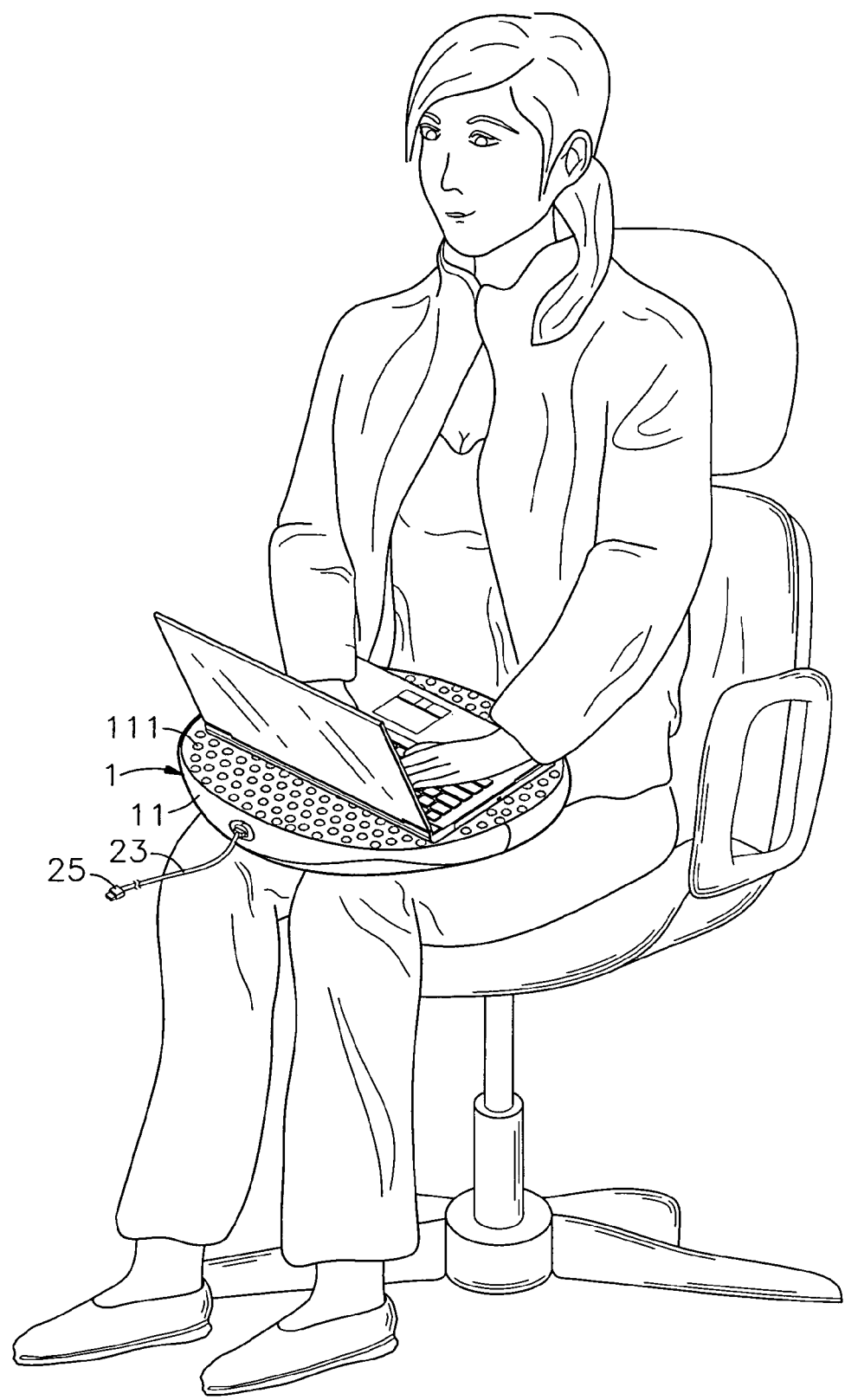
FIG. 6 shows an application example of the present invention.

Referring to FIGS. 5 and 6, when using a notebook computer with the cooler pad, the cooler pad is placed on the user's lap, and then the notebook computer is placed on the cooler pad. By means of keeping the raised portions 111 at the bottom side of the cooler pad in contact with the user's lap, the cooler pad is positively positioned on the user's lap. At this time, the bottom wall of the notebook computer is kept in direct contact with the raised portions 111 and 212 at the top side of the cooler pad. Thereafter, the power connector 25 is connected to the notebook computer to obtain the necessary working voltage from the notebook computer for the cooling fan 22. Therefore, the cooling fan 22 is electrically connected to cause currents of air during operation of the notebook computer. By means of the operation of the cooling fan 22, cooling air is circulating through gaps in between each two adjacent raised portions 212 of the cover plates 21, the air vents 211 of the cover plates 21 and the accommodation space 13 of the soft pad 1 to carry waste heat away from the notebook computer. After use, the power connector 25 is disconnected from the notebook computer, and the cable reel 24 winds back the power cord 23 automatically.

Further, the cover layer 11 of the soft pad 1 can be made of a cloth material having an embossed design or carrying a color pattern. In the aforesaid preferred embodiment, the power cord 23 extends to the outside of the soft pad 1 through the passage 14. Alternatively, the power cord 23 can be extended out of the soft pad 1 through one air vent 211 of one cover plate 21 for connection to an external power source by the power connector 25.

In conclusion, the invention provides a cooler pad for notebook computer, which has advantages and features as follows:

1. The soft pad 1 has the accommodation space 13 vertically cut through the top and bottom sides thereof and covered with the cover plates 21 to accommodate the cooling fan 22, and the cooling fan 22 is firmly held in the accommodation space 13 of the soft pad 1 between the two cover plates 21.

2. The first locating holes 151 and second locating holes 152 of the locating holes 15 are vertically cut through the top and bottom sides of the soft pad 1 for the mounting of the hooks 261 and locating posts 262 of the cover plates 21 to hold the cooling fan 22 firmly in place.

3. The first locating holes 151 and second locating holes 152 of the locating holes 15 are spaced around the accommodation space 13 for receiving the hooks 261 and locating posts 262 of the cover plates 21 so that the hooks 261 and locating posts 262 of the cover plates 21 surround the cooling fan 22 after insertion of the retaining rods 27 into the accommodation space 13 to hold down the cooling fan 22, keeping the cooling fan 22 firmly in place.

A prototype of cooler pad has been constructed with the features of FIGS. 1~6. The cooler pad functions smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A cooler pad, comprising:
   a soft pad, said soft pad comprising a cover layer, a soft stuffing material stuffed in said cover layer, and an accommodation space vertically cut through said cover layer and said soft stuffing material; and
   a fan module mounted in said soft pad, said fan module comprising a cooling fan accommodated in said accommodation space inside said soft pad, said cooling fan comprising a power cable extending to the outside of said soft pad and terminating in a power connector for connection to external power source means, and two cover plates respectively covered on top and bottom sides of said accommodation space to hold down said cooling fan, each said cover plate comprising a plurality of air vents disposed in communication between said accommodation space and the atmosphere and a positioning structure, the positioning structures of said cover plates being fastened to each other.

2. The cooler pad as claimed in claim 1, wherein said soft pad comprises a plurality of locating holes vertically cut through said cover layer and said soft stuffing material and spaced around said accommodation space for the mounting of said positioning structures of said cover plates.

3. The cooler pad as claimed in claim 2, wherein said locating holes comprise a plurality of first locating holes and second locating holes; each said positioning structure comprises a plurality of hooks and locating posts respectively inserted into said first locating holes and said second locating holes.

4. The cooler pad as claimed in claim 1, wherein said soft stuffing material of said soft pad is selected from a material group of polyurethane, ethylene vinyl acetate, memory foam and low-stress gel.

5. The cooler pad as claimed in claim 1, wherein said cover layer of said soft pad is selected from a material group of PVC sheet material, PVC fabric, nylon, genuine leather, artificial leather, cotton fabric, felt fabric and linen fabric.

6. The cooler pad as claimed in claim 1, wherein said cover layer of said soft pad comprises a plurality of raised portions protruded from an outer surface thereof.

7. The cooler pad as claimed in claim 1, wherein the cover plate that is covered on the top side of said accommodation space of said soft pad comprises a plurality of raised portions protruded from a top wall thereof for supporting a notebook computer.

8. The cooler pad as claimed in claim 1, wherein said soft pad comprises a passage transversely extended from said accommodation space to the periphery thereof for guiding said power cord of said cooling fan to the outside of said soft pad; said cooling fan further comprises a cable reel mounted in said passage for winding back said power cord.

9. The cooler pad as claimed in claim 1, wherein said power cord of said cooling fan extends to the outside of said soft pad through one said air vent of one said cover plate.

10. The cooler pad as claimed in claim 1, wherein said power connector is a USB connector.

11. The cooler pad as claimed in claim 1, wherein said power connector is a power plug.

12. The cooler pad as claimed in claim 1, wherein each said cover plate comprises a plurality of retaining rods respectively inserted into said accommodation space and fastened to said cooling fan to hold down said cooling fan in said accommodation space.

* * * * *